T. W. GUTHRIE.
VEHICLE WHEEL.
APPLICATION FILED NOV. 6, 1911.
1,205,528.
Patented Nov. 21, 1916.
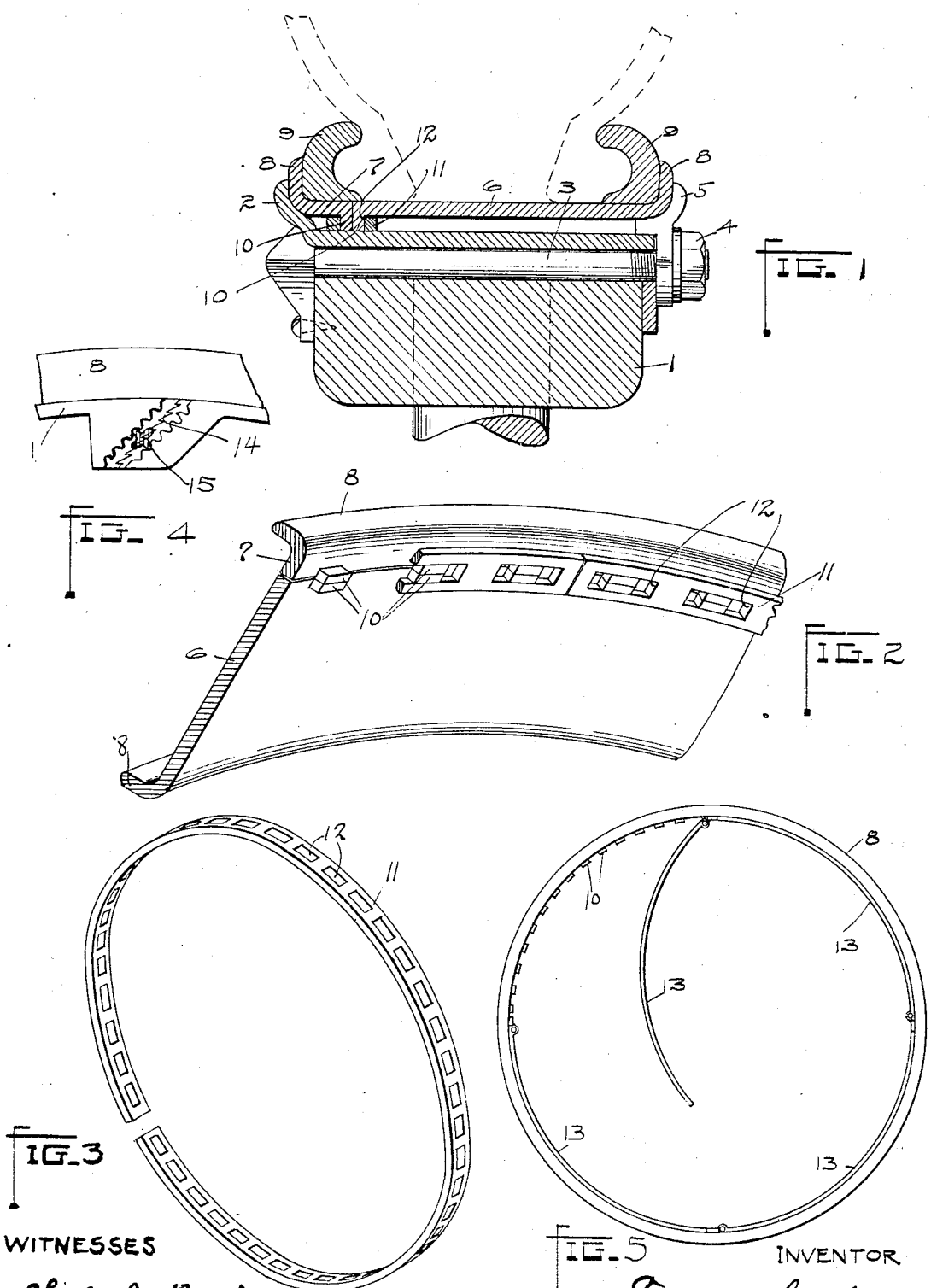

UNITED STATES PATENT OFFICE.

TRACY W. GUTHRIE, OF CLEVELAND, OHIO, ASSIGNOR TO THE STANDARD WELDING COMPANY, OF CLEVELAND, OHIO, A CORPORATION OF OHIO.

VEHICLE-WHEEL.

1,205,528.      Specification of Letters Patent.      Patented Nov. 21, 1916.

Application filed November 6, 1911. Serial No. 658,676.

*To all whom it may concern:*

Be it known that I, TRACY W. GUTHRIE, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

The present improvements relate to vehicle wheels of the sectional channel type, which have so largely come into use in connection with pneumatic tired wheels.

The object of the invention is to provide a combined "quick detachable" and demountable rim, where the term "quick detachable" is employed as in the trade to designate a rim made up of sections that may be quickly separated or taken apart in order to remove a tire shoe from the rim or place one thereon with corresponding expedition. Among the improvements comprehended are locking means for securing the sections of the rim together, which will not stick, even though more or less corroded or obstructed with dust and dirt; the sections, furthermore, are so constructed that when the locking means are removed, they may be directly separated, thus much facilitating the removal of the shoe where the latter "freezes" thereto, as is apt to be the case when a tire has remained in use unchanged for a considerable time.

To the accomplishment of the foregoing and related ends, the invention then consists of the means hereinafter fully described and particularly pointed out in the claims.

The annexed drawing and the following description set forth in detail certain mechanism embodying the invention, such disclosed means constituting, however, but several of the various mechanical forms in which the principle of the invention may be used.

In said annexed drawing: Figure 1 is a transverse section through a wheel felly with my improved "quick detachable" rim shown as mounted thereon; Fig. 2 is a side elevational view of a portion of such rim showing the means for locking the sections of such rims together; Fig. 3 is a perspective of the locking member proper; Fig. 4 illustrates one modification in the construction of said member; and Fig. 5 shows yet another modified form thereof.

The construction of the felly 1 is not of any particular interest in the present connection, nor is the particular device, shown in Fig. 1 for securing the rim onto said felly, presented as a part of the present invention. Such device, which is merely typical of a number of well known arrangements for this purpose, comprises an inclined flange 2 that forms part of the rim of the felly, and bolts 3 transversely mounted in said felly with their free ends screwthreaded to receive nuts 4. The latter in turn bear against wedge members 5 that have inclined faces corresponding with that of the inclined flange 2, so that the tire-supporting rim may be clamped between the opposed faces of said flange and these wedge members. Such tire-supporting rim, which, as previously indicated, is of the "quick-detachable" type, comprises two annular sections 6 and 7 with straight abutting edges, so that when said sections are brought into proper coöperative relation the assembled rim is of the form clearly appearing in Figs. 1 and 2. Such assembled rim is adapted to seat in the space between the flange 2 and the wedges 5 but, when thus seated sufficient space is left between its inner surface and the felly rim or band for the locking means presently to be described. While the edges of this tire-supporting rim may be turned up to form flanges for securing tire shoes either of the Dunlop or clencher type, I preferably form such flanges 8 at right angles to the base of the rim, and of just sufficient height to retain reversible rings 9 of familiar form, that are adapted to coöperate either with such Dunlop or clencher tires, as desired, thus rendering the rim strictly universal. These rings are continuous, as will be readily understood, and in order to reverse them, require to be slipped off the rim sections and then be placed in proper position. The line of separation between the two annular sections of the rim is preferably located well to one side of the center so that the adjacent ring 9 will cover such line, leaving a smooth surface for the inner tube of the tire to press against, as also preventing the entrance of water within the shoe which might occur, if the line of division were inside the edge of the shoe.

On the inner faces of the respective sections 6 and 7, are provided two series of lugs 10 of similar shape that are adapted to register with each other when the sections are brought into proper relation with each other. In order to retain these lugs in such registering position, I employ a locking band or ring 11 of resilient material, preferably of spring steel, and having a series of longitudinally extending slots 12 somewhat longer than the aforesaid lugs, but of a width just sufficient to take in two of the latter when brought up side by side. This band may be of the simple split form illustrated in Fig. 3, or it may be composed of sections 13, as shown in Fig. 5. The outer diameter of the band, whether in one or more sections, is equal to the inner diameter of the rim section so that when placed within the latter, in engagement with the lugs on such sections, the ends of the band will abut, as is shown in Fig. 2. Any simple tool, as a screw driver, will serve to bring the ends into this relation, or to pry apart, when it is desired to remove the band. By having the slots 12 of greater length than the lugs in a circumferential direction, that is, in the plane of the rim, the band may readily adjust itself relatively to said lugs when it is expanded into this locking position. Instead of having the band formed simply with plain ends thus adapted to abut against each other, such ends may be made to overlap and the overlapping edges be provided with engaging teeth 14, as illustrated in Fig. 4 somewhat after the fashion of a printer's quoin. A key 15 (shown in section) can be employed to force them apart or draw together, depending on whether it is desired to lock the band in place within the rim sections, or to release such band, just as the parts of such quoin are operated.

As has been indicated it is not necessary that the band be in a single piece, but it may be made up of several segments or parts 13, as shown in Fig. 5. As further shown in this figure, these segments may then be pivotally or otherwise secured at one end to one of the rim sections, preferably the wider one. The free ends of such pivoted ring segments 13 may be simply sprung into place to lock the rim-sections 6 and 7 together, or securing means of any desired kind may be utilized for this purpose.

It will be understood that the only strain which the locking band or ring has to sustain, is the one transverse of its length that is produced by the expanding effect of the inner tire upon the inclosing shoe which is seated between the flanges 9 on the rim sections. Moreover, once the sectional tire supporting rim is mounted upon the wheel felly, there is no possibility of the locking band springing inwardly, whether such band be of one piece or a number of sections. In this condition, moreover, a portion of the lateral strain is relieved by the clamping means employed to demountably secure the tire-supporting rim onto the felly.

From the foregoing description it will also be seen that the rim-sections are free to separate the moment the locking band is removed and that to remove the latter no relative rotative movement of parts is involved, nor any special tools. This simplicity and ease of operation is a feature particularly appreciated by users of pneumatic tired vehicles.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A tire-supporting rim for vehicle wheels, including annular sections adapted to laterally abut and provided with registering, inwardly directed lugs; and a segmental band movably attached at one end to one of said rim-sections and adapted to be expanded outwardly against said rim-sections, said band being provided with a series of slots, each such slot being adapted to engage with a corresponding pair of registering lugs, thereby holding said rim-sections against relative transverse movement.

2. A tire-supporting rim for vehicle wheels, including annular sections adapted to laterally abut and provided with registering, inwardly directed lugs, each such pair of said lugs forming together a rectangular projection having its longer dimensions parallel with the plane of said rim; and a segmental band movably attached at one end to one of said rim-sections and adapted to be expanded outwardly against said rim-sections, said band being provided with a series of slots, each such slot being of rectangular form, and of a size adapting it to snugly engage the lateral faces of such a rectangular projection but permitting relative movement between the latter and such slot in the plane of said rim.

3. A tire-supporting rim for vehicle wheels, including annular sections adapted to laterally abut and provided with registering, inwardly directed lugs along their respective abutting edges; and an annular band made up of segments each pivotally attached at its one end to one of said rim-sections and adapted to be expanded outwardly against the latter, the respective segments of said band being provided with a series of spaced slots adapted to engage a corresponding series of such registering pairs of said lugs to hold said sections against relative movement.

4. A tire-supporting rim for vehicle wheels, including annular sections adapted to laterally abut and provided with registering, inwardly directed lugs; and an annular band made up of segments each pivotally attached at one end to one of said rim-sections and adapted to be expanded outwardly against the latter, the respective segments of said band being provided with slots longer than said lugs and of a width just sufficient to engage a registering pair thereof to hold said sections against relative transverse movement.

Signed by me this 3rd day of November, 1911.

TRACY W. GUTHRIE.

Attested by—
ANNA L. GILL,
JNO. F. OBERLIN.